United States Patent
Berndhaeuser et al.

(10) Patent No.: US 8,347,653 B2
(45) Date of Patent: Jan. 8, 2013

(54) METHOD AND DEVICE FOR HOMOGENIZING GLASS MELT

(75) Inventors: Christoph Berndhaeuser, Nieder-Olm (DE); Frank-Thomas Lentes, Bingen (DE); Karin Naumann, Ober-Olm (DE); Hans Duerolf, Gau-Bischofsheim (DE); Holger Hunnius, Mainz (DE)

(73) Assignee: Schott AG, Mainz (DE)

(*) Notice: Subject to any disclaimer, the term of this patent is extended or adjusted under 35 U.S.C. 154(b) by 1024 days.

(21) Appl. No.: 11/957,727

(22) Filed: Dec. 17, 2007

(65) Prior Publication Data
US 2008/0148780 A1 Jun. 26, 2008

(30) Foreign Application Priority Data

Dec. 20, 2006 (DE) .......................... 10 2006 060 972

(51) Int. Cl.
*C03B 5/187* (2006.01)
(52) U.S. Cl. .......................... 65/178; 65/135.3; 65/135.4
(58) Field of Classification Search .................. 65/135.3, 65/135.4, 134.1, 13, 5.2, 178, 346, 347
See application file for complete search history.

(56) References Cited

U.S. PATENT DOCUMENTS

| | | | | |
|---|---|---|---|---|
| 2,716,023 A * | 8/1955 | Cleveland | ....................... | 65/180 |
| 2,831,664 A | 4/1958 | Spremulli | | |
| 5,241,558 A * | 8/1993 | Nagashima et al. | ............ | 373/27 |
| 5,273,567 A * | 12/1993 | Richards | ....................... | 65/134.8 |
| 5,550,857 A * | 8/1996 | Richards | ......................... | 373/27 |
| 6,763,684 B2 * | 7/2004 | Pitbladdo | ..................... | 65/135.4 |
| 7,127,919 B2 * | 10/2006 | Goller et al. | .................. | 65/135.3 |
| 7,578,144 B2 * | 8/2009 | Bergman et al. | ............. | 65/135.3 |
| 7,735,340 B2 * | 6/2010 | Burdette et al. | ............. | 65/135.2 |
| 8,256,951 B2 * | 9/2012 | Adelsberg et al. | .......... | 366/328.1 |
| 2002/0023464 A1 | 2/2002 | Pitbladdo | | |
| 2003/0101750 A1* | 6/2003 | Goller et al. | .................. | 65/135.3 |
| 2008/0011016 A1* | 1/2008 | Bergman et al. | ............. | 65/29.12 |
| 2009/0282872 A1* | 11/2009 | Tomamoto et al. | ............... | 65/66 |
| 2010/0126225 A1* | 5/2010 | Ding et al. | .................... | 65/135.3 |
| 2011/0205836 A1* | 8/2011 | Lentes et al. | ............. | 366/325.92 |
| 2012/0180529 A1* | 7/2012 | Singer | .......................... | 65/135.3 |

FOREIGN PATENT DOCUMENTS

| | | |
|---|---|---|
| JP | 63-8226 | 1/1988 |
| JP | 10-265226 | 10/1998 |
| JP | 2001-072426 | 3/2001 |

* cited by examiner

*Primary Examiner* — Jason L. Lazorcik
(74) *Attorney, Agent, or Firm* — Michael J. Striker

(57) ABSTRACT

The device for homogenizing a glass melt has a melt receptacle and at least one stirring device arranged in the melt receptacle. Each stirring device consists of a stirrer shaft and stirrer blades extending toward an inside wall of the receptacle, which are configured to produce an axial feed of the glass melt in an inner stirring region between the stirrer shaft and front ends of the stirrer blades. The melt receptacle and the stirring device are configured so that a melt flow caused by the axial feed, which is opposite to the axial feed, seals a gap formed between the inside wall and the front ends of the stirrer blades, so that the glass melt cannot flow directly through the gap to a lower axial end of the inner stirring region. The invention also encompasses a method of homogenizing a glass melt.

19 Claims, 5 Drawing Sheets

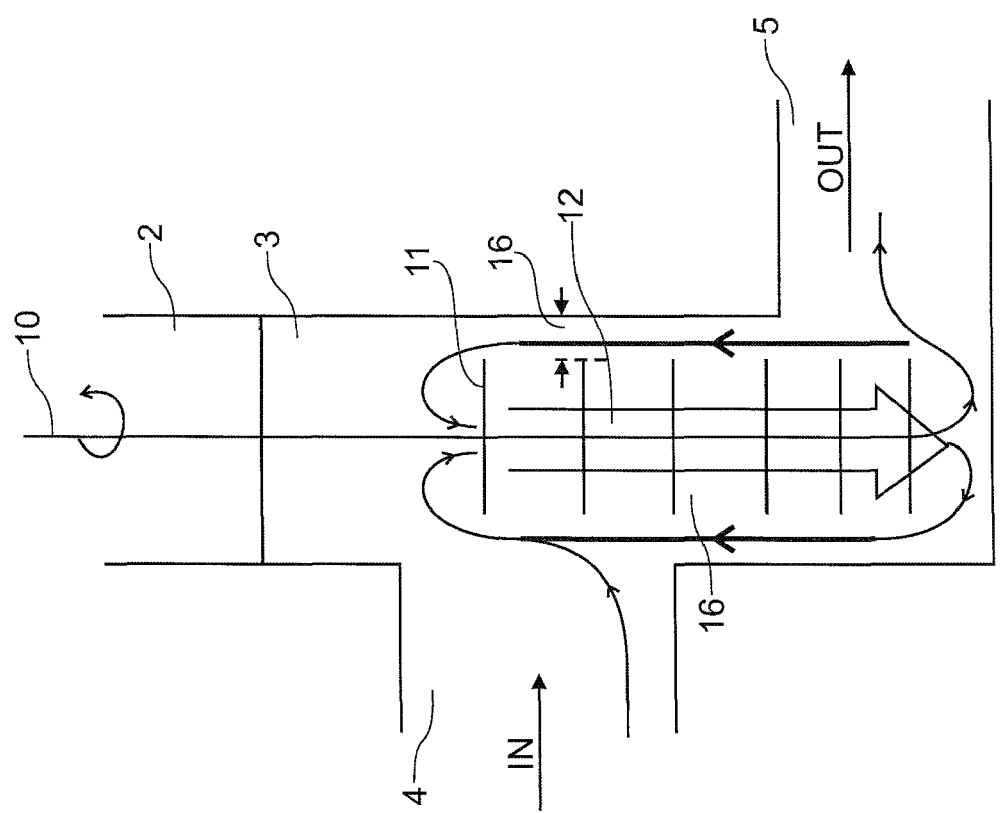

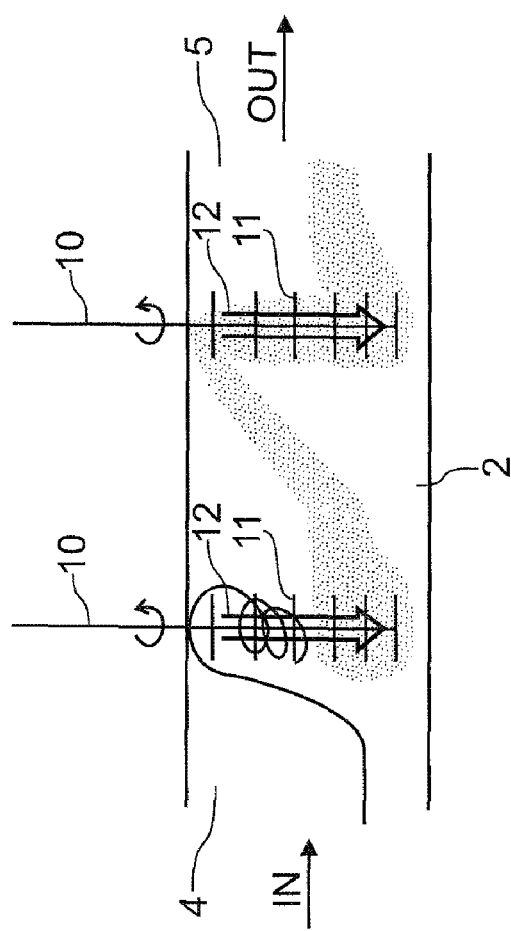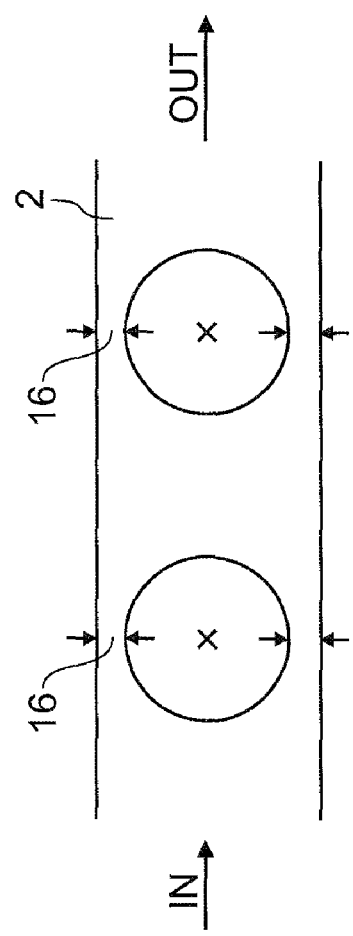

METHOD AND DEVICE FOR HOMOGENIZING GLASS MELT

CROSS-REFERENCE

The present application claims the priority of the German patent application DE 10 2006 060 972.7 "Method and Device for Homogenizing Glass Melt", filed on Dec. 20, 2006, the entire content of which is hereby incorporated in the present application by reference.

BACKGROUND OF THE INVENTION

1. Field of the Invention

The present invention relates to the homogenizing of a glass melt, and particularly to the homogenizing of a glass melt used for the production of a glass or glass ceramic product having high quality and a low inclusions and/or imperfection density, such as display glass.

2. Background of the Invention

The objective of homogenizing a glass melt is to reduce spatial and temporal variations in the chemical composition of the glass melt, in accordance with the product requirements. Chemical inhomogeneities can result in inhomogeneities in the refractive index, which may impair optical depiction, for example, and in inhomogeneities in the viscosity, which may result, for example, in uncontrolled geometrical variations during hot finishing processes or hot processing. To this end, a differentiation is made between macro-inhomogeneities, which is to say a variation in chemical composition on comparatively large spatial scales of, for example, a few centimeters having small spatial gradients, and micro-inhomogeneities (also referred to as striations), which is to say a variation of the chemical composition on small spatial scales of, for example, 0.1 to 2 mm having in part large spatial gradients. The goal of the homogenizing process is to eliminate macro-inhomogeneities and micro-inhomogeneities to as great an extent as is possible so that, for example, a smooth progression of the refractive index can be obtained.

Glass melts are characterized in that, in typically used stirring systems, they have viscosities ranging between 1 and 200 Pa·s, which results in laminar flow of the glass melt (Reynolds number<1), and in that the chemical coefficient of diffusion is generally less than $10^{-12}$ m$^2$/s, so that homogenization that can be achieved by way of diffusion is negligibly small. Rather, homogenization of glass melts can generally only be achieved by considerably expanding, redistributing and chopping local inhomogeneities and/or striations. For this purpose stirring systems are used, which comprise a melt receptacle for temporarily receiving the glass melt and at least one stirring device for stirring the glass melt in the melt receptacle.

In order to achieve any suitable homogenization under the above conditions, particularly with high viscosities and small chemical coefficients of diffusion, the gap between the stirrer blades of the stirring device and the wall of the melt receptacle is conventionally kept to a minimum. An excessively narrow gap between the stirrer blades and the melt receptacle wall, however, poses the risk of the stirrer coming into contact with the wall of the melt receptacle, with consequent damage to the stirrer and/or the stirrer vessel. Here, it must be remembered that the stirrer can only ever be adjusted when the melt receptacle is in a cooled state. Because thermally induced deformation of the stirrer or of the stirring system are unavoidable when heating to operating temperatures, the adjustment of the components is often no longer correct at the operating temperatures. This can result in an excessively narrow distance between the stirrer blades and the melt receptacle wall, and thus in direct contact with the material, which ultimately results in destruction of the stirring system.

The relative marginal gap width, i.e. the ratio 0.5*(diameter of the stirring device or diameter of the melt receptacle minus diameter of the stirrer)/(diameter of the stirring device or of the melt receptacle), is typically less than approximately 5%, or even less than approximately 1%, of the melt receptacle diameter or of the diameter of the stirring device. Due to the aforementioned thermal deformation of the components when heating the device to the operating temperature, the width of the gap cannot be consistently maintained, so that large marginal gaps must typically be specified. For this reason, only unsatisfactory homogenization results are achieved with the state of the art, particularly for high-viscosity glass melts.

High shear stress between the stirrer blades and melt receptacle wall due to a narrow marginal gap can considerably impair the service life of the stirring system. In addition, there is the risk that, if the stirring gap is excessively narrow, bubbles adhering to the melt receptacle wall may be sheared off and transferred into the product. High shear stresses can also bring about abrasion of the wall material of the melt receptacle or stirrer vessel, resulting in micro-inclusions in the glass or the glass ceramic, which are not desirable, particularly in display glass products.

US 2003/0101750 A1 discloses a method and a device for homogenizing a glass melt for the production of display glass. At a predefined stirring efficiency, which is determined by the stirrer diameter, stirrer speed and marginal gap, a predefined shear rate is selected. The marginal gap is comparatively narrow and corresponds approximately to 6% to 9% of the free diameter of the stirrer vessel.

Furthermore homogenization can also be achieved by the geometry of the actual stirrer blades. The inclination of the stirrer blades and hence the feed action of the stirrer are preferably set such that the blades operate counter to the glass flow in the glass melt receptacle. To this end, an axial feed action can be achieved by the angle of the stirrer blades, by the geometric shape of the stirrer blades and/or by a helical arrangement of the stirrer blades on the stirrer shaft. For example, JP 10265226 A discloses a configuration, wherein, the inner stirrer blades feed downward, while the outer stirrer blades feed upward so as to achieve improved homogenization. JP 63008226 A discloses that the inclination of the stirrer blades, and hence the feed action of the stirrer, can be adjusted so that the blades operate counter to the glass flow. In this way, dead space in the glass melt receptacle should be avoided.

For the reasons given above, according to the state of the art, the smallest possible marginal gap is always desirable with a view to achieving the highest possible homogeneity.

U.S. Pat. No. 2,831,664 discloses a method and a device for homogenizing a glass melt, comprising a stirring device having a plurality of stirrer blades axially offset in relation to one another. The stirring device is disposed in a cylindrical stirrer pot, which is provided with an inlet for the glass melt at an upper edge and an outlet for the glass melt at the lower end. In a marginal gap between the inside wall of the stirrer pot and the stirrer blades the stirrer blades form a plurality of regions having radial and at the same time vertical glass flow. The dimensions of the stirring device produce a very narrow marginal gap, resulting in very high material stresses caused by the very high shear rates that are applied.

JP 2001-72426 A and the English abstract thereof disclose a device for homogenizing a glass melt. The stirring device is disposed in a cylindrical stirrer pot, which is provided with an inlet for the glass melt at an upper end and an outlet for the glass melt at the lower end. The glass flows in the marginal gap between the inside wall of the stirrer pot and the stirrer blades and also in the stirrer circuit are flows flowing in the same direction in relation to the superimposed throughput flow. This results in a comparatively poor homogenization result.

US 2002/0023464 A1 discloses a device for homogenizing a glass melt, comprising a centerline recirculation channel, specifically on the inside of the mixing shaft, or a separate external recirculation channel. The glass melt consequently does not flow back in a marginal gap as defined by the present invention. A very narrow gap between the inside wall of the stirrer pot and the mixing blades is disclosed, which produces a very high mechanical load on the stirrer and the stirrer vessel.

US 2003/0101750 A1 discloses a method, which is modified compared to the aforementioned U.S. Pat. No. 2,831,664, wherein the disadvantage of a very narrow marginal gap is mitigated in that the stirrer system is enlarged almost to scale in order to guarantee homogeneity with increased mass throughput. This is achieved either by increasing the rotational speed or by enlarging the stirrer volume. A rotational speed increase, however, brings about an increased shear rate and thus a higher precious metal exposure level, including the undesirable generation of precious metal particles in the stirrer vessel. An enlarged stirrer volume is associated with higher material use and costs.

Both solutions are mathematically defined with the help of a non-dimensional homogeneity number H, which defines the homogenization potential of the stirring device. It is apparent that, at a fixed homogeneity number H and predefined throughput, the rotational speed of the stirring device is considered in a linear fashion and the size of the stirrer system is considered, in the case of geometric similarity, only with the reciprocal third root (cubic root). A desired homogenization level can thus be implemented much more easily with the help of a to-scale enlargement of the stirrer system than with a rotational speed increase, particularly since a rising rotational speed increases the shear forces and material stress or particle abrasion in the marginal gap.

SUMMARY OF THE INVENTION

Despite various efforts in the state of the art, there is a continued need for methods and devices that enable even more efficient homogenization of glass melts. In particular, according to the present invention a method and a device for homogenizing a glass melt are to be provided, wherein high homogeneity can be achieved while applying low stress on the components of the device, enabling easily and precisely adjusting the device, and creating minimized abrasion or a low bubble shear rate.

The present invention is thus based on a method for homogenizing a glass melt in a melt receptacle that serves as a stirrer vessel, such as a cylindrical vessel or a melt channel, wherein at least one stirring device is disposed in the melt receptacle, which comprises a stirrer shaft and a plurality of stirrer blades carried by the stirrer shaft and projecting therefrom, wherein a gap or stirring gap is formed between a wall region of the melt receptacle and the stirrer blades.

According to the invention, the stirring device or the apparatus is configured such that in an inner stirring region of the stirring device, which is to say between the stirrer shaft and the stirrer blades, an axial feed action is applied in order to feed the glass melt in the inner stirring region along the stirrer shaft. By suitably configuring the stirring device and/or apparatus, further according to the invention, the axial feed action is applied so that a melt flow brought about by the axial feed action seals the gap between the wall region of the melt receptacle and the stirrer blades against direct passage of the glass melt.

Surprisingly, it was found that the dynamic sealing of the marginal gap according to the invention enables excellent homogenization of glass melts, particularly high-viscosity glass melts, despite considerably larger marginal gap widths. Thus, according to the present invention, considerably larger marginal gap widths can be used than has been conventionally possible. Due to the considerably larger marginal gap widths, according to the invention, the stress on the components of the device can be significantly reduced. According to the invention, negligible material abrasion and a low bubble shear rate can, in particular, be achieved, while the complexity required to adjust the components of the device is kept low.

Thus, according to the invention, all glass inhomogeneities, regardless of the point of entry into the stirrer system, reach the inner stirring region between the stirrer shaft and the ends of the stirrer blades and are reduced there by means of expansion, chopping and spatial redistribution. With the method according to the present invention, comparatively large gap widths can be achieved between the stirrer blades and the inside wall of the melt receptacle. In this way, interferences caused by high shear rates, such as abrasion, corrosion or inclusions due to abrasion of the lining material of the melt receptacle and/or stirrer blade material, can be prevented. In order to achieve the sealing effect, it is not essential according to the invention for the melt flow brought about by the axial feed action of the respective stirring device to actually move counter to the entering glass melt. Rather, it is sufficient that the gap be actively or dynamically sealed in the manner of a stopper made of glass melt, which is to say due to an accumulation of glass melt material. Preferably, however, a flow is present in the gap, which is directed counter to the direction of the axial feed action applied by the stirring device, so that the entire inflowing glass melt is entrained to the upper end of the stirring device by the glass melt ascending in the marginal gap. In any case, direct passage of the inflowing glass melt through the marginal gap to the outlet of the stirrer vessel or melt receptacle is prevented.

According to a further embodiment, direct entry of the glass melt into the inner stirring region is actively or dynamically prevented by one or more stirrer blades. To this end, particularly, a reorientation of the entering glass flow can be brought about, for example toward an axial end of the inner stirring region, from where the entering glass melt is fed to an opposite axial end of the inner stirring region or of the stirrer shaft, where the flow actively or dynamically contributes to sealing the gap between the wall region of the melt receptacle and the stirrer blades.

According to a further embodiment, the stirrer blades of the stirring device extend across a portion of the cross-section of the inlet of the melt receptacle. Thus, a certain portion of the cross-section of the melt flow entering through the inlet is covered by the stirrer blades in order to prevent direct entry of the inflowing glass melt into the inner stirring region. The inflowing glass melt, regardless of the point of entry, is rather diverted to the upper end of the stirring device and it is only there that the melt enters the inner stirring region. The percentage by which the cross-section of the inflowing glass melt is covered by the stirrer blades can be at least 50%. Even better homogenization of the glass melt can be achieved according to a further embodiment, if the cross-section of the inflowing glass melt is covered by more than two thirds by the stirrer blades. In contrast to the state of the art, the stirrer blades thus protrude beyond the lower edge of the inlet.

According to a further embodiment, the axial feed action of the stirring device can be dimensioned such that, for example by a suitable increase of the stirrer speed, multiple passages of the glass melt through the inner stirring region are brought about. In other words, the glass melt exiting the axial end of the inner stirring region flows through the gap between the wall region of the melt receptacle and the stirrer blades in a direction opposite to the axial feed direction in the inner stirring region, thus achieving the active sealing of the aforementioned gap region.

In order to achieve the axial feed action, optionally one or more of the following parameters can be set as necessary: angles or inclination of the stirrer blades, geometric shape of the stirrer blades, helical arrangement of the stirrer blades along the circumference of the stirrer shaft, rotational speed of the stirrer, diameter of the stirring device, number of stirrer blades, feed action of the stirrer blades, and the like.

The above parameters can notably be simulated and systematically established with the help of mathematical and/or physical simulations of the flow conditions in the glass melt receptacle such that, based on such a simulation, optimized stirring results can be achieved as a function of the required specifications. For the physical simulation, in particular, model systems having comparable or downscaled dimensions and viscosity levels can be used, and the homogenization can be visually observed and optically evaluated by introducing color stripes in the inflowing viscous fluid.

According to a further embodiment, the melt receptacle that serves as a stirrer vessel is a channel-shaped receptacle through which the glass melt flows continuously. According to a further embodiment, the flow through the melt receptacle is discontinuous, which can be achieved, for example, by intermittently replenishing the melt receptacle. The glass melt then flows through the glass melt receptacle in a predefined throughput direction. According to a preferred further embodiment, the axial feed action, which is brought about by the respective stirring device, occurs in the throughput direction of the glass melt.

According to a further embodiment, a plurality of virtual stirrer vessels form under the axial feed action in the melt receptacle, the vessels being configured as described above, wherein the virtual stirrer vessels are connected in series and the glass melt fed by an upstream stirring device in the inner stirring region of a downstream stirring device is transferred to the axial end thereof such that direct entry of the glass melt, which is delivered by the upstream stirring device, into the inner stirring region of the downstream stirring device is actively prevented by one or more stirrer blades. In each of the virtual stirrer vessels, the glass melt is homogenized as a function of the respectively selected parameters of the stirrer vessel, achieving an overall homogenization level that is the nth power of the homogenization level of an individual stirrer vessel. Such an embodiment is particularly suited for a melt receptacle configured as a melt channel, through which the glass melt flows in a predefined direction, particularly continuously.

According to a preferred embodiment, the width of the marginal gap between the front ends of the stirrer blades and the inside surface of the melt receptacle or stirrer vessel is greater than approximately 5% to approximately 20%, and preferably greater than approximately 5% to a maximum of approximately 15% of the diameter of the stirring device. As a result, the marginal gap is comparatively wide and, according to the invention, undesirable interference, such as abrasion or corrosion of material of the wall of the melt receptacle and/or of the stirring device, can be avoided.

According to a further embodiment, at least one such stirring device, as described above, is used for controlling a mass flow of the glass melt in the melt receptacle, regardless of the temperature and/or viscosity of the glass melt. For this purpose, the rotational stirrer speed can, in particular, be suitably controlled.

BRIEF DESCRIPTION OF THE DRAWINGS

The invention will be described in more detail hereinafter by way of example and with reference to the accompanying drawings, which disclose further characteristics, advantages and objectives to be achieved, wherein:

FIG. 1 is a schematic sectional view of a device according to a first embodiment of the present invention;

FIG. 4a and FIG. 4b shows a schematic sectional side view and a schematic top view of the series connection of a plurality of stirring devices according to the present invention for forming virtual stirring devices in a glass melt channel according to a further exemplary embodiment of the present invention; and FIG. 5a and FIG. 5b shows a schematic sectional side view and a schematic top view of the parallel arrangement of a plurality of stirrer devices according to the present invention for forming virtual stirring devices in a glass melt channel according to a further exemplary embodiment of the present invention.

In the figures, identical reference numerals denote identical or substantially equivalent elements or groups of elements.

DETAILED DESCRIPTION OF PREFERRED EMBODIMENTS

Figure 2B:
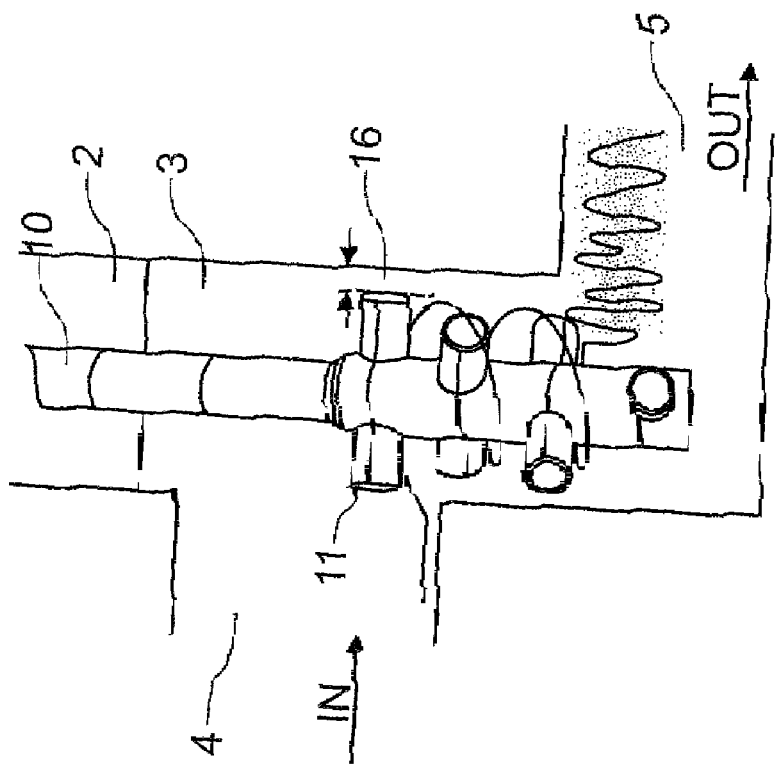
FIG. 2b shows the configuration of the stirring device according to FIG. 2a in a cylindrical stirrer vessel, which is basically suited for performing the method according to the present invention.

According to FIG. 1, a stirrer, which will be described hereinafter in more detail with reference to FIGS. 2a and 3a, comprising a plurality of stirrer blades 11 is disposed in a generally cylindrical stirrer vessel 2 in a point-symmetrical configuration. A glass melt 3 is received in the receptacle 2. The glass melt 3 can flow continuously or discontinuously through the stirrer vessel 2, specifically from the inlet 4 to the outlet 5. As is indicated by the arrow 12, an axial feed action is applied in the inner stirring region, between the stirrer shaft 10 and the front ends of the stirrer blades 11, which feeds the entering glass melt 3 from the upper axial end of the inner region 12 to the lower axial end thereof. This is achieved by suitably configuring the stirrer, which will be described in more detail hereinafter. The glass melt exiting at the lower axial end of the inner stirring region 12 brings about active sealing of the gap 16 between the front ends of the stirrer blades 11 and the inside wall of the cylindrical stirrer vessel 2 in the region of the stirring device such that the entering glass melt, and particularly the glass melt entering through the inlet 4, cannot flow directly through the gap 16 to the lower axial end of the inner stirring region 12 and can also not directly reach the stirrer shaft 10, but instead, as is indicated by the arrow, is first diverted upward and toward the upper axial end of the inner stirring region 12 and is then drawn into the inner stirring region 12. In this way, the marginal gap 16 between the front ends of the stirrer blades 11 and the inside wall of the cylindrical stirrer vessel 2 is completely sealed, without requiring an excessively narrow marginal gap, which is described in more detail hereinafter.

In this way, the striations and/or inhomogeneities in the glass melt 3 are drawn into the inner stirring region 12 and stirred there, thus achieving homogenization of the glass melt.

In the example according to FIG. 1, an upward flow is produced in the marginal gap 16, the flow being indicated by the arrow, as a result of which the passage of striations and/or inhomogeneities through the marginal gap 16 downward is blocked and the marginal gap is dynamically sealed. In principle, however, such an axial upward flow is not absolutely essential. It suffices if the marginal gap 16 is sufficiently sealed or blocked by the glass melt exiting the lower axial region of the inner stirring region 12 in the manner of a stopper made of glass melt or a material accumulation.

In this way, all glass inhomogeneities, regardless of the entry point into the stirrer system, reach the inner stirring region between the stirrer shaft and the ends of the stirrer blades and are sufficiently eliminated there by means of expansion, chopping and spatial redistribution. It will be apparent without difficulty to the person skilled in the art that the homogenization can be further improved by cascading two or more such stirring devices, whereby the remaining glass inhomogeneity decreases by the nth power of the remaining glass inhomogeneity, downstream of a stirring device. According to FIG. 1, the axial feed action occurs in the direction of the general glass flow from the inlet 4 to the outlet 5.

It is easily apparent from FIG. 1 that sections of the cross-section of the inlet 4 are covered by sections of the stirrer, namely by the stirrer blades 11, such that direct entry of the inflowing glass melt into the inner stirring region 12 is prevented. Or more precisely, in the example according to FIG. 1 more than 50% of the cross-section of the inlet 4 is covered by the stirrer. Further analysis by the inventors has shown that coverage of at least 50%, and more preferably of at least two thirds, can lead to satisfactory homogenization results with a comparatively wide marginal gap 16.

Figure 2A:
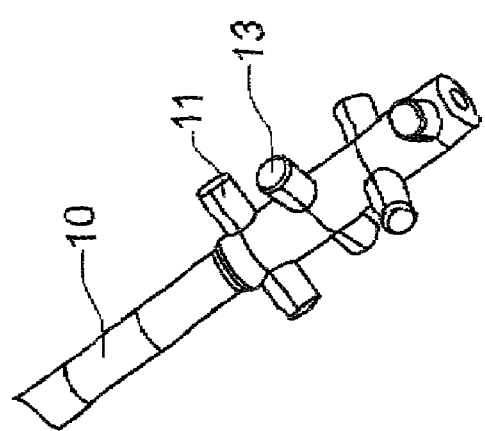
FIG. 2a shows a conventional stirring device.

FIG. 2a shows an example of a conventional stirrer. According to FIG. 2a, the stirrer comprises a cylindrical stirrer shaft 10, from the outer circumference of which diametrically opposed pairs of cylindrical radial protrusions 11 having faces 13 with circular profiles project axially offset in relation to one another. According to FIG. 2a, a total of five pairs of stirrer blades 11 are disposed on the outer circumference of the stirrer shaft 10 in an overall helical configuration. Analysis by the inventors demonstrated that an axial feed action and sealing of the marginal gap as defined by the invention cannot be produced by the axial feed action of such a conventional stirrer.

FIG. 2b shows the arrangement of such a stirrer in a cylindrical stirrer vessel having an inlet 4 and an outlet 5 for the glass melt 3. If D denotes the inside diameter of the cylindrical stirrer vessel and d the diameter of the stirrer blades 11, the following equation holds for the marginal gap: $s=(D-d)/2$. This marginal gap is adjusted such that a certain level of homogenization can be achieved. It has been shown that the relative marginal gap s/D can be adjusted to be considerably smaller than in a stirrer according to the invention. Typically, the relative marginal gap s/D must be selected at considerably smaller than 5%.

The line in FIG. 2b schematically illustrates the results of physical simulations of the operation of a stirring device of this type. For this purpose, a stirring device having transparent walls was set up and this was operated with a transparent fluid of a comparable viscosity that with the intended operating conditions. A color stripe was produced with dye in the fluid flowing in through the inlet 4. Thus, it was possible to visually observe and optically evaluate the homogenization of the fluid.

As is apparent from FIG. 2b, the inflowing fluid is not diverted toward the upper region of the stirrer, but instead it enters the inner stirring region of the stirrer directly from the inlet 4. As the spiral-shaped line indicates, the color stripe is swirled to a certain degree. Only at the upper end of the outlet 5 was a relatively narrow color stripe observed which, as the dot density indicates, had a comparatively high dye concentration in a central region that decreased toward the marginal regions of the stripe extending across approximately one third of the cross-section of the outlet 5. Overall, thus the inhomogeneities in the fluid were not uniformly distributed across the entire cross-section of the outlet 5. Further analysis on the part of the inventors also showed that the position and the concentration profile of this stripe were not independent of the entry point of the color stripe in the inlet 4. The homogenization level that was achieved was therefore not satisfactory. As the line in the stripe in outlet 5 indicates, certain chaotic effects occurred in the concentration profile at the outlet 5.

Figure 3B:
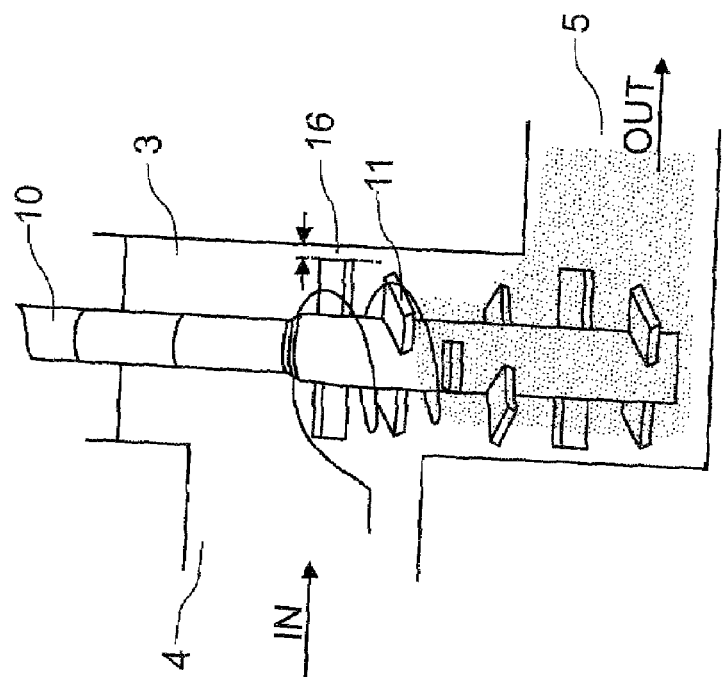
FIG. 3b shows the arrangement of the stirring device according to FIG. 3a in a cylindrical stirrer vessel.
Figure 3A:
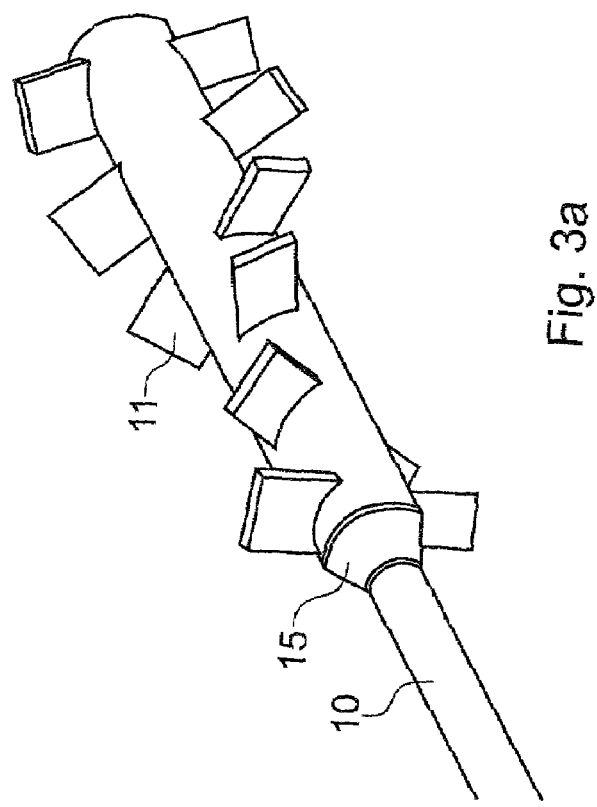
FIG. 3a shows a stirring device according to one exemplary embodiment of the present invention.

FIG. 3a illustrates a stirrer according to a further exemplary embodiment, wherein the stirrer blades 11 are configured as obliquely angled (inclined) plates or according to a further embodiment are configured substantially in a paddle shape. In the example according to FIG. 3a, a total of six pairs of stirrer blades 11 are disposed in a helical configuration on the outer circumference of the stirrer shaft 10. To this end, the stirrer shaft 10 transitions from a bevelled shoulder 15 into a widened region at the front end of the stirrer, from which the stirrer blades 11 project.

FIG. 3b shows the stirrer according to FIG. 3a disposed in a cylindrical stirrer vessel. According to FIG. 3b, approximately 50% of the cross-section of the inlet 4 is covered by the stirrer blades 11 of the stirrer. The lines summarize the results of a physical simulation, wherein a color stripe is introduced at the lower end of the inlet 4 into a transparent fluid having a viscosity comparable to that with the intended operating conditions. As is apparent from the line, first all of the fluid that enters is diverted toward the upper end of the stirrer. There, all of the entering fluid enters the inner stirring region of the stirrer and is fed axially downward.

In FIG. 3b the line and dot density schematically indicates the color concentration profile. It is readily apparent from FIG. 3b that strong homogenization of the fluid is already achieved in the upper third of the inner stirring region, so that the color stripe that entered was completely and uniformly distributed. The color concentration profile was uniform across the entire cross-section of the outlet 5. This result was observed regardless of the entry point of the color stripe in the inlet 4.

Further analyses and mathematical simulations conducted by the inventors showed that direct passage of the fluid flowing in through the inlet 4 to the outlet 5 is prevented because a fluid flow flowing counter to the axial feed action develops in the marginal gap 16, so that the flow dynamically seals the marginal gap 16. In this way, all of the inflowing fluid is diverted toward the upper end of the stirrer. The entire inflowing fluid thus reaches the inner stirring region of the stirrer, thus bringing about intensive homogenization of the fluid.

Particularly good homogenization can be achieved only if the stirrer feed device is in agreement with the direction of the glass throughput between the inlet 4 and the outlet 5 and if the entry of the glass melt into the stirring device is such that one or more stirrer blades 11 prevent direct entry into the inner stirring region in the vicinity of the stirrer shaft 10.

In this manner, substantially regardless of the entry point, all striations and/or glass inhomogeneities must pass through the inner stirring region, which is to say the region between the stirrer shaft 10 and the front ends of the stirrer blades 11, and thereby are expanded, spatially redistributed and chopped. According to the invention, high glass homogeneity is achieved in this way, without the necessity of keeping the gap between the stirrer vessel and stirrer blades extremely tight, for example smaller than approximately 5 mm.

Through physical or mathematical simulations, the number of stirrer blades, the shape thereof, the azimuth angle thereof and the distances in relation to one another as well as the installation height in the stirrer vessel can be optimized for respective stirring tasks. The rotational stirrer speed is adjusted so that the best possible homogenization result can be achieved, without producing undesirable side effects such as reboil or excess corrosion of the materials used.

In many cases, the use of a cylindrical stirrer vessel is technically not desirable for a variety of reasons, for example if high mass throughput rates are to be achieved. Hereinafter a channel stirrer system based on the principles of the present invention is described with reference to FIGS. 4*a* and 4*b*.

According to FIG. 4*a*, the glass melt flows through the channel 2, wherein the melt flows in through the inlet 4 and exits the channel 2 in the region of the outlet 5. As is apparent from the top view according to FIG. 4*b*, a marginal gap 16 is formed between the front ends of the stirrer blades and the lateral wall of the channel 2, the width of the gap according to the invention ranging between greater than approximately 5% to a maximum of approximately 15% of the diameter of the respective melt receptacle.

The stirrers each bring about an axial feed action, which is indicated by the arrow 12 and described above. In this way, direct entry of the glass melt into the inner stirring region of the respective stirrer is prevented by the rotating stirrer blades 11. The glass melt flowing in through the inlet 4 is thus first drawn upward, then diverted to the upper axial end of the front stirrer and then drawn into the inner stirring region. In this example, the rotational speed of the stirrer is selected so that the glass melt circulates multiple times in the region of the respective stirrer, which is indicated by the flow arrows. Each stirrer thus forms a virtual stirrer vessel as defined by the present invention. Only a portion of the fed glass melt is fed to a further virtual stirrer vessel disposed downstream, wherein due to the rotating stirrer blades 11, direct entry of the glass melt into the inner stirring region is accordingly prevented and due to the axial feed action of the downstream stirrer the glass melt is first drawn upward and then diverted toward the axial end of the downstream stirrer, where the melt is then drawn into the inner stirring region.

The line progression and/or the dot density in FIG. 4*a* schematically illustrates the result of a physical simulation, as described above based on FIG. 2*b* and FIG. 3*b*. It is apparent that nearly complete homogenization of the fluid was already achieved in the upper third of the first stirrer.

Further mathematical simulations by the inventors demonstrated that, with a channel-shaped stirrer device of this sort, the axial mass flow brought about by the axial feed action is always larger than a throughput flow through the channel.

Due to the axial feed action, overall virtual stirrer vessels are created, wherein the glass melt is fed from the top to the bottom or from the bottom to the top, without entering the stirrer circuit. As a result, the distance of the stirrers from the wall of the melt channel can be increased, without inhomogeneities passing through this gap. By optimizing the rotational speed of the stirrers, diameter, number of stirrer blades, feed action of the stirrer blades, the helical arrangement thereof on the stirrer shaft and comparable parameters as well as through mathematical and/or physical simulations, optimized stirring results can be achieved for the respective application.

Figure 5A:
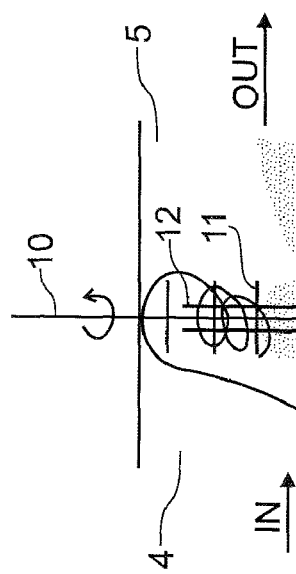
Figure 5B:
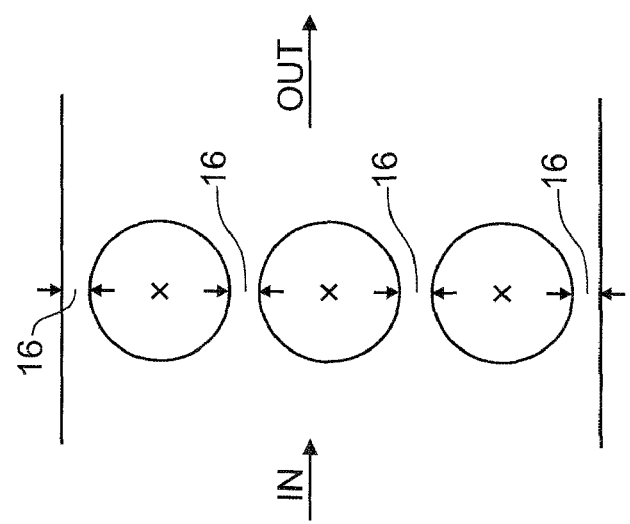

FIG. 5*a* and FIG. 5*b* show a further example of an inventive channel-shaped stirring device, wherein the stirrers are not connected in series in the passage direction of the channel, but instead are disposed aligned along an axis, which intersects the channel at a right angle.

As will be apparent to the person skilled in the art without difficulty, stirring devices, as described above, can be used to control the mass flow of the glass melt in the melt receptacle, regardless of the temperature and/or viscosity of the melt. The stirrers and/or stirrer vessels can be made partially or entirely of precious metal or one or more other refractory metal. Particularly preferred is the use of precious metal alloys, particularly a platinum-rhodium alloy, in particular to achieve high melting temperatures.

It will be readily apparent to the person skilled in the art that the underlying principle of the present invention for homogenizing a glass melt can be used for the production of display glass, particularly glass panes for LCD, OLED or plasma displays, for the production of glass ceramics, of borosilicate glass or of optical glass. Due to the dynamic sealing of the marginal gap, considerably larger gap widths can be achieved, so that according to the invention material abrasion can be reduced. This also means that, according to the present invention, the carrying away of particles and impairment of glass quality in the state of the art, no longer occur.

LIST OF REFERENCE NUMERALS

1 Stirring device
2 Melt receptacle/stirrer vessel
3 Melt
4 Inlet
5 Outlet
10 Stirrer shaft
11 Stirrer blade
12 Stirring region having axial feed action
13 End face of the stirrer blade 11
14 Axis of rotation
15 Step
16 Gap/marginal gap

What is claimed is:

1. A device for homogenizing a glass melt entering said device via an inlet for said glass melt, said device consisting of:
   a melt receptacle having an inside wall, wherein said inlet is provided in said inside wall and at a first axial end of said melt receptacle and an outlet is provided at a second axial end of said melt receptacle opposite to said first end;
   wherein said inlet is provided in said axially extending inside wall so that said glass melt enters the melt receptacle laterally; and
   at least one stirring device arranged in the melt receptacle, said at least one stirring device each consisting of a stirrer shaft and a plurality of stirrer blades extending from the stirrer shaft toward the inside wall;
   wherein said stirrer blades and said stirrer shaft are configured to produce an axial feed action in an inner stirring region between the stirrer shaft and front ends of the stirrer blades to thereby convey said glass melt in said inner stirring region along said stirrer shaft and in a throughput direction, in which said glass melt flows through said melt receptacle from said inlet to said outlet; and wherein at least two of said stirrer blades of said at least one stirring device extend across a portion of a cross-section of said inlet to thereby prevent direct entry of the glass melt into the inner stirring region, said melt receptacle, said stirrer shaft and said stirrer blades are configured, so that a melt flow caused by the axial feed action in the inner stirring region, which is opposite to said axial feed, occurs in a gap formed between the inside wall of the melt receptacle and the front ends of the stirrer blades, and said melt flow in said opposite direction is caused by said axial feed action in said inner stirring region and dynamically seals said gap, thus preventing the glass melt from flowing directly through said gap from said inlet provided in said inside wall to said outlet.

2. The device according to claim 1, wherein said at least two of said stirrer blades cover at least 50% of the cross-section of the inlet.

3. The device according to claim 2, wherein a width of said gap is greater than 5% by no more than 15% of a diameter of the melt receptacle.

4. The device according to claim 2, wherein said inlet is provided at an upper axial end of the melt receptacle, said outlet is provided at a lower end of the melt receptacle and said axial feed action conveys said glass melt in said inner stirring region from said upper axial end of said inner stirring region to said lower axial end.

5. The device according to claim 4, wherein a width of said gap is greater than 5% by no more than 15% of a diameter of the melt receptacle.

6. The device according to claim 1, wherein a width of said gap is greater than 5% by no more than 15% of a diameter of the melt receptacle.

7. The device according to claim 6, wherein said inlet is provided at an upper axial end of the melt receptacle, said outlet is provided at a lower end of the melt receptacle and said axial feed action conveys said glass melt in said inner stirring region from said upper axial end of said inner stirring region to said lower axial end.

8. The device according to claim 1, wherein the axial feed action in the inner stirring region is due to at least one of: obliquely angled stirrer blades, a geometric shape of the stirrer blades and a helical arrangement of the stirrer blades.

9. The device according to claim 1, wherein said at least one stirring device consists of a plurality of said stirring devices arranged in series in the melt receptacle.

10. The device according to claim 9, wherein said at least one stirring device in the melt receptacle forms a virtual stirrer vessel, with an axial mass flow brought about by the axial feed action that is greater than a throughput flow through the melt receptacle.

11. The device according to claim 10, wherein the melt receptacle is configured, at least in sections thereof, as a channel through which the glass melt flows.

12. The device according to claim 1, wherein the melt receptacle and the at least one stirring device are made of metal or are coated with said metal.

13. The device according to claim 12, wherein said metal is selected from the group consisting of precious metals and precious metal alloys.

14. The device according to claim 1, wherein the melt receptacle and/or the at least one stirring device are made of ceramic refractory material or are coated with said ceramic refractory material.

15. The device according to claim 1, further comprising a control device in order to control a mass flow of the glass melt into the melt receptacle with the aid of said at least one stirring device, regardless of the temperature and viscosity of the glass melt.

16. The device according to claim 1, wherein a number of said stirrer blades on said stirrer shaft, an inclination of said stirrer blades, a geometric shape of said stirrer blades, a helical arrangement of said stirrer blades and a diameter of said stirrer blades and a width of said gap are each selected so that said melt flow in said opposite direction, which is caused by said axial feed action in said inner stirring region, seals said gap so that the glass melt cannot flow directly through said gap from said inlet to said outlet.

17. The device according to claim 1, wherein said at least two of said stirrer blades cover at least two-thirds of said cross-section of said inlet.

18. A device for homogenizing a glass melt entering said device via an inlet for said glass melt, said device consisting of:

a melt receptacle having an inside wall, wherein said inlet is provided in said inside wall and at a first axial end of said melt receptacle and an outlet is provided at a second axial end of said melt receptacle opposite to said first end;

wherein said inlet is provided in said axially extending inside wall so that said glass melt enters the melt receptacle laterally; and at least one stirring device arranged in the melt receptacle, said at least one stirring device each consisting of a stirrer shaft and a plurality of stirrer blades extending from the stirrer shaft toward the inside wall;

wherein said stirrer blades and said stirrer shaft are configured to produce an axial feed action in an inner stirring region between the stirrer shaft and front ends of the stirrer blades to thereby convey said glass melt in said inner stirring region along said stirrer shaft and in a throughput direction, in which said glass melt flows through said melt receptacle from said inlet to said outlet; and wherein at least two of said stirrer blades of said at least one stirring device cover at least 50% of a cross-section of said inlet to thereby prevent direct entry of the glass melt into the inner stirring region, said melt receptacle, said stirrer shaft and said stirrer blades are configured, so that a melt flow caused by the axial feed action in the inner stirring region, which is opposite to said axial feed, occurs in a gap formed between the inside wall of the melt receptacle and the front ends of the stirrer blades, and said melt flow in said opposite direction is caused by said axial feed action in said inner stirring region and dynamically seals said gap, thus preventing the glass melt from flowing directly through said gap from said inlet provided in said inside wall to said outlet; and wherein a width of said gap is greater than 5% by no more than 15% of a diameter of the melt receptacle.

19. A device for homogenizing a glass melt entering said device via an inlet for said glass melt, said device consisting of:

a melt receptacle having an upper axial end and a lower axial end, said melt receptacle being provided with an outlet at said lower axial end and having an axially extending inside wall, wherein said inlet is provided in said axially extending inside wall so that said glass melt enters the melt receptacle laterally; and at least one stirring device arranged in the melt receptacle, said at least one stirring device each consisting of an axially extending stirrer shaft and a plurality of stirrer blades extending from the stirrer shaft toward the inside wall;

wherein said stirrer blades and said stirrer shaft are configured to produce an axial feed action in an inner stirring region between the stirrer shaft and front ends of the stirrer blades to thereby convey said glass melt in said inner stirring region along said stirrer shaft and in a throughput direction, in which said glass melt flows through said melt receptacle from said inlet to said outlet; and wherein at least two of said stirrer blades of said at least one stirring device cover at least 50% of a cross-section of said inlet to thereby prevent direct entry of the glass melt into the inner stirring region, said melt receptacle, said stirrer shaft and said stirrer blades are configured, so that a melt flow caused by the axial feed action in the inner stirring region, which is opposite to said axial feed, occurs in a gap formed between the inside wall of the melt receptacle and the front ends of the stirrer blades, and said melt flow in said opposite direction is caused by said axial feed action in said inner stirring region and dynamically seals said gap, thus preventing the glass melt from flowing directly through said gap from said inlet provided in said inside wall to said outlet; and wherein a width of said gap is greater than 5% by no more than 15% of a diameter of the melt receptacle.

* * * * *